United States Patent [19]

Günther et al.

[11] Patent Number: 4,541,831

[45] Date of Patent: Sep. 17, 1985

[54] DUSTLESS, WATER-SOLUBLE, SOLID, DYESTUFF OR OPTICAL BRIGHTENER COMPOSITIONS AND A PROCESS OF PRODUCTION

[75] Inventors: Walter Günther, Grenzach-Wyhlen; Kurt Hintermayr, Rheinfelden, both of Fed. Rep. of Germany

[73] Assignee: Ciba-Geigy Corporation, Ardsley, N.Y.

[21] Appl. No.: 221,166

[22] Filed: Dec. 29, 1980

Related U.S. Application Data

[63] Continuation of Ser. No. 52,538, Jun. 4, 1979, abandoned, which is a continuation of Ser. No. 856,899, Dec. 2, 1977, abandoned.

[51] Int. Cl.$^4$ ............ C09B 1/04; C09B 1/10; C09B 5/02; D06L 3/12
[52] U.S. Cl. ............................. 8/648; 8/655; 8/662; 8/685; 106/288 Q; 106/308 Q; 106/309; 534/607; 534/611; 534/793; 534/845; 534/887; 534/576; 534/609
[58] Field of Search ............ 260/208; 8/576, 611, 8/613, 648, 655, 662, 685; 534/607, 611, 576, 887, 845, 793; 106/288 Q, 308 Q, 309

[56] References Cited

U.S. PATENT DOCUMENTS

| 2,181,800 | 11/1939 | Crossley et al. ............. 260/208 UX |
| 2,981,729 | 4/1961 | Kesler et al. ......................... 260/191 |

FOREIGN PATENT DOCUMENTS

| 737876 | 2/1970 | Belgium ............................. 260/208 |
| 1469719 | 2/1969 | Fed. Rep. of Germany ...... 260/208 |
| 2512108 | 10/1975 | Fed. Rep. of Germany ...... 260/208 |
| 2616639 | 10/1976 | Fed. Rep. of Germany ...... 260/208 |
| 882534 | 11/1961 | United Kingdom ................ 260/208 |
| 1425237 | 2/1976 | United Kingdom ................ 260/208 |
| 1439538 | 6/1976 | United Kingdom ................ 260/208 |

*Primary Examiner*—Floyd D. Higel
*Attorney, Agent, or Firm*—Edward McC. Roberts; Kevin T. Mansfield

[57] ABSTRACT

Described is a process for the production of substantially dustless water-soluble dye or optical brightener compositions, which process comprises mixing a dry, solid inorganic salt, heated to at least 50° C., with a mixture of at least one dye or optical brightener, an adhesive as e.g. sorbitol, a dust binding surface active agent and further additives. Such compositions are negligibly dusty to dustfree, and retain these properties even after storage for months, particularly in the case where spray-dried material is used.

21 Claims, No Drawings

DUSTLESS, WATER-SOLUBLE, SOLID, DYESTUFF OR OPTICAL BRIGHTENER COMPOSITIONS AND A PROCESS OF PRODUCTION

This is a continuation of application Ser. No. 52,538 filed on June 4, 1979, which in turn is a continuation of application Ser. No. 856,899, filed Dec. 2, 1977, (now both abandoned).

The invention relates to a process for the production of negligibly dusty preparations by the addition of a preheated inorganic salt to specific dye preparations and optical brightener preparations; and to the negligibly dusty preparations obtained by this process.

It is known that salts and other auxiliaries are mixed with dyes and optical brighteners for the purpose of diluting these. By the process of simply mixing the components together, there are obtained preparations which contain a high proportion of fine particles. These tend to create severe dust contamination, in consequence of which the handling of these preparations is rendered difficult, and possibilities of their application are limited. It is also known that to overcome these disadvantages it is possible to bind the undesirable dust by, for example, adding, or applying by fine spraying, a dust-binding agent to the mixture. But even with the addition of large amounts of a dust-binding agent, no lasting binding of the dust can be obtained in the majority of cases, particularly in the case of spray-dried products. After only a few weeks, a nondusty or negigibly dusty product again becomes a dusty preparation.

It has now been found that by mixing a preheated inorganic salt with a mixture comprising at least one dye or optical brightener, an adhesive, a dust-binding agent and further additives, there is surprisingly obtained a lasting binding of the dust.

The dyes usable in the process according to the invention are, e.g., anionic dyes, cationic dyes, metal-complex dyes such as 1:1- and 1:2-copper complexes, 1:1- or 1:2-chromium complexes or 1:1- and 1:2-cobalt complexes, disperse dyes, reactive dyes, vat dyes, chrome dyes, pigments and direct dyes. Suitable chemical classes of dyes are, for example, nitro, monoazo, disazo, polyazo, stilbene, diphenylmethane, triphenylmethane, quinophthalone, coumarin, oxazine, azomethine or methine dyes. Particularly good results are obtained with water-soluble dyes, especially with cationic dyes.

Optical brighteners of any class can be used. They can be, for example, stilbene compounds such as cyanuric derivatives of 4,4'-diaminostilbene-2,2'-disulphonic acid or distyrylbiphenyls, coumarins, benzocoumarins, pyrazines, pyrazolines, oxazines, mono- or dibenzoxazolyl compounds or mono- or dibenzimidazolyl compounds, and also naphthalic acid imides and naphthotriazole derivatives and v-triazole derivatives. Water-soluble optical brighteners are preferred.

The dyes or optical brighteners are used in the dry form, advantageously as spray-dried or ground powders, and they can be either dusty or nondusty.

The adhesives usable in the process according to the invention are compounds which soften or melt in the temperature range of 30° to 150° C., especially 40° to 90° C. The following are for example suitable: sorbitol, urea, hydrated dextrose, glucose, lactose, mannitol, mannose, and polyethylene glycol having a molecular weight of about 3000. The compounds preferred are those containing at least five hydroxyl groups in the molecule.

The adhesive is advantageously used as solid powder in amounts of about 2 to 10 percent by weight, preferably 3 to 7 percent by weight, relative to the final preparation. In cases where the adhesive is difficult to disperse, it is also possible to use a concentrated solution of the adhesive.

Depending on the employed dye or optical brightener, suitable dust-binding agents are cationic, anionic or nonionic surface-active agents. The surface-active agent chosen must not undergo any undesired reactions with the dye or optical brightener. Nonionic surface-active agents are preferably used, for example polyether glycols as copolymers from ethylene oxide and propylene oxide (block polymers), or polyether alcohols such as condensation products from alcohols or phenols with ethylene oxide. The dust-binding agent is used in amounts of 1 to 10 percent by weight, preferably 3 to 5 percent by weight, relative to the final preparation.

Further suitable additives are water-soluble organic compounds, these being in particular polyhydroxy compounds having a melting point above 100° C., such as derivatives of sugar, cellulose or starch. A starch derivative, such as dextrin, is preferably used. Other additives which can be used are auxiliaries, such as dispersing agents, stabilisers against oxidative or reductive effects, as well as in particular solid acids or bases or buffering substances for the pH adjustment. The amount of the additives depends on the desired degree of dilution of the dye or of the optical brightener, and is 10 to 50 percent by weight, preferably 20 to 30 percent by weight, relative to the final preparation.

Suitable inorganic salts are those which do not soften at the temperature at which they are used, which undergo no undesirable reactions with the dye or optical brightener, and which on heating do not appreciably change the original grain structure. They are above all alkali metal salts of strong inorganic acids, such as sulphuric acid, phosphoric acid, hydrochloric acid and carbonic acid. The following are for example used: mono-, di- and trisodium phosphate, sodium pyrophosphate, sodium chloride, potassium chloride, sodium hydrogen carbonate or sodium carbonate and preferably sodium hydrogen sulphate, and especially anhydrous sodium sulphate. The salts are used in amounts of about 20 to 50 percent by weight, preferably 25 to 40 percent by weight, relative to the final preparation.

The actual process according to the invention comprises thoroughly mixing the dye or optical brightener, particularly a cationic dye, with the adhesive, especially sorbitol, the dust-binding agent, particularly a nonionic surface-active agent, and further additives, advantageously dextrin, and optionally a solid acid, e.g. sulphamic acid, in a mixer at room temperature. Suitable mixers for this purpose are, in particular, those which have mixing tools incorporated, such as intensive mixers, high-speed mixers (Lödige mixers) and kneader mixers, or high-speed stirrers using the centrifuge-whirl process. A preheated, dry, inorganic salt, advantageously sodium sulphate, is then introduced as quickly as possible into the operating mixer. The level of the salt temperature is at least 50° C., preferably 70° to 90° C., and is limited upwards by the temperature sensitivity of the dye or of the optical brightener. The amount of salt and rate of addition are governed on the one hand by the desired degree of dilution of the dye or optical brightener, and on the other hand by the temperature to be attained in the mixer, which temperature is between 25° and 65° C., preferably between 30° and 50° C. After completion of the salt addition, stirring is continued for 1 to 15 minutes, preferably 5 minutes, and the formed preparation is cooled in the stationary mixer to room temperature; it is subsequently removed and optionally packed.

By the process according to the invention are obtained preparations which are negligibly dusty to dust-free, and which retain these properties even after storage over a period of months, e.g. 10 to 12 months, particularly in the case where spray-dried material is used.

The following dust test was carried out to determine the behaviour of the substance with regard to the release of dust.

Onto a metal cylinder having a capacity of 500 ccm is placed a metal funnel having an inside diameter of 10 cm and a tube (inside diameter 15 mm) of which the lower end extends down to the 200 ccm level on the cylinder. At the 400 ccm level on the cylinder is fixed a round paper filter having a hole at the centre (Schleicher & Schuell LS 14); the filter paper is moistened with water to the extent that it is moderately moist but not dripping wet. An amount of 10 g of the substance to be tested is then quickly poured through the funnel; after a waiting time of 3 minutes, the funnel is removed and the round filter paper is removed by cutting. This filter paper is evaluated on the basis of a 5-rating scale as follows:

rating 1 = highly dusty if the round paper filter is heavily tinted to intensely dyed;
rating 2 = considerably dusty if the round paper filter is slightly tinted;
rating 3 = moderately dusty if the round paper filter displays a large number of spots of colour which are partially touching one another;
rating 4 = slightly dusty if the round paper filter displays small dots of colour but no connected spots of colour;
rating 5 = negligibly dusty if the round paper filter displays a scarcely perceptible staining, with at most scattered small dots of colour.

The preparation obtainable according to the invention are used for dyeing and printing or optically brightening materials which can be dyed or optically brightened with these preparations, particularly textile materials.

In the following Examples which further illustrate the invention, the term 'parts' denotes parts by weight; and the temperature values are given in degrees Centigrade.

EXAMPLE 1

33 parts of the pulverulent dye of the formula

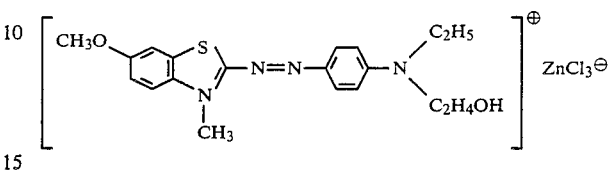

26 parts of dextrin, 3 parts of solid sorbitol, 1 part of sulphamic acid and 3 parts of a condensation product from 1 mole of nonylphenol with 9.5 moles of ethylene oxide are thoroughly mixed at room temperature in a Lödige mixer. 34 parts of anhydrous sodium sulphate are separately heated to 70°, and then introduced within 2 minutes into the mixer whilst it is running. It is allowed to run for a further 5 minutes. After cooling of the mixture to room temperature and its removal from the mixer, it is in the form of a dye preparation having the dust rating of 5, which preparation exhibits even after a storage time of 6 months no change in its dust-release behaviour.

Preparations giving similarly good results are obtained by using, instead of the condensation product from nonylphenol with ethylene oxide, a block polymer from ethylene oxide and propylene oxide.

A dust-binding effect which is likewise excellently durable is obtained by using, instead of sorbitol, an equal amount of urea, hydrated dextrose, glucose, lactose, mannitol, mannose, or polyethylene glycol having a molecular weight of above 3000, with the processing procedure otherwise being as described above.

By using, instead of the above dye and the anhydrous sodium sulphate, an equal amount of one of the dyes or optical brighteners listed in the following Table (column 2) and of one of the salts listed therein (column 3), with otherwise the same processing procedure, there are obtained preparations having the dust ratings shown in column 4. The behaviour with regard to release of dust shows in the case of these preparations no change even after a storage time of 8 months.

TABLE

| Example No. | Dye | Salt | Dust rating |
|---|---|---|---|
| 2 | ![dye structure with CH3O, S, benzothiazole-N(C2H5), N=N, N(CH3)2, ZnCl3⊖] | Na2HPO4 | 5 |
| 3 | ″ | Na4P2O7 | 5 |
| 4 | ″ | NaHCO3 | 5 |
| 5 | ″ | NaCl | 5 |
| 6 | ![dye structure with CH3, triazole N-CH3, N=N, N(C2H5)2, ZnCl3⊖] | Na2CO3 | 5 |

TABLE-continued

| Example No. | Dye | Salt | Dust rating |
|---|---|---|---|
| 7 | " | Na₂HPO₄ | 5 |
| 8 | 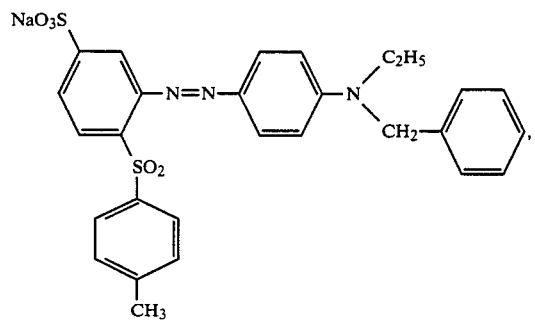 | Na₃PO₄ | 5 |
| 9 | 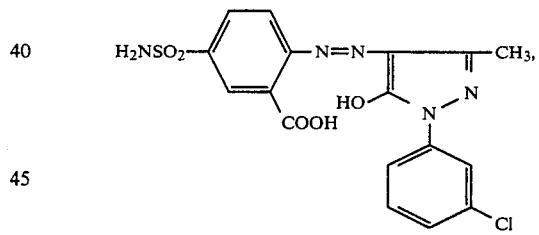 | Na₂SO₄ | 5 |

EXAMPLE 10

33 parts of the dye of the formula

[structure: NaO₃S-phenyl-N=N-phenyl-N(C₂H₅)(CH₂-phenyl), with SO₂-phenyl-CH₃ substituent]

22 parts of dextrin and 7 parts of sorbitol are thoroughly mixed in a mixer provided with a mixing tool. During mixing are added 3 parts of a condensation product from 1 mole of nonylphenol with 9.5 moles of ethylene oxide. After thorough mixing, 35 parts of sodium hydrogen carbonate, which has been separately preheated to 70°, are added within 2 minutes. After further mixing for 5 minutes and subsequent cooling to room temperature, the product removed from the mixer is a dye preparation having the dust rating 5, which is still retained even after a storage time of 12 months.

A likewise excellently durable dust-binding effect is obtained by using in Example 10, instead of sodium hydrogen carbonate, an equal amount of one of the following salts:

| Salt | Dust rating |
|---|---|
| sodium chloride | 5 |
| sodium carbonate | 4 |
| trisodium phosphate | 5 |
| sodium pyrophosphate | 4 |
| disodium hydrogen phosphate | 4 |
| sodium sulphate | 5 |
| sodium hydrogen sulphate | 5 |

EXAMPLE 11

33 parts of the symmetrical 2:1 chromium complex of the dye of the formula

[structure: H₂NSO₂-phenyl(COOH)-N=N-C(OH)=C(CH₃)-N-N-phenyl-Cl]

22 parts of dextrin, 7 parts of sorbitol and 3 parts of a condensation product from 1 mole of nonylphenol with 9.5 moles of ethylene oxide are thoroughly mixed at room temperature in a Lödige mixer. 35 parts of sodium carbonate are preheated separately to 70°, and then introduced within 2 minutes into the mixer whilst it is running. The stirrer is switched off after operating for a further five minutes. After cooling to room temperature, the product removed from the mixer is a dye preparation having the dust rating 4.

We claim:

1. A process for the production of a substantially dustless water-soluble dye or optical brightener composition, which process comprises mixing a dry, solid, alkali metal salt of an inorganic acid, heated to at least 50° C., with a mixture of at least one dry water-soluble dye or optical brightener, an organic adhesive having a softening or melting point in the range of 30° to 150° C. and selected from the group consisting of sorbitol, urea, hydrated dextrose, glucose, lactose, mannitol, mannose, and polyethylene glycol having a molecular weight of above 3000, a dust-binding agent which is a surface-active agent, and one or more further additives selected from the group consisting of a water-soluble organic polyhydroxy compound having a melting point above 100° C., a dispersing agent, and a solid acid, base or buffer for pH adjustment.

2. Process according to claim 1, wherein the addition of the inorganic salt is made while the mixture is being stirred in a mixer which is provided with a mixing tool.

3. Process according to claim 2, wherein a kneader mixer or a mixer using the centrifuge-whirl process is used.

4. Process according to claim 1, wherein an inorganic salt preheated to 70° to 90° C. are used.

5. Process according to claim 1, wherein the salt is added in such a manner that after completion of the addition the temperature in the mixer is between 25° and 65° C.

6. Process according to claim 1, wherein the adhesive is used in amounts of 2 to 10 percent by weight, relative to the final preparation.

7. Process according to claim 6, wherein the adhesive is used in amounts of 3 to 7 percent by weight, relative to the final preparation.

8. Process according to claim 1, wherein a cationic dye is used.

9. Process according to claim 1, wherein the adhesive used is an organic substance having a softening or melting point in the range of 40° to 90° C.

10. Process according to claim 9, wherein the adhesive used is a compound containing at least 5 hydroxyl groups per molecule.

11. Process according to claim 1, wherein the dust-binding agent used is a nonionic surface-active agent.

12. Process according to claim 11, wherein the dust-binding agent used is a polyether alcohol or polyether glycol.

13. Process according to claim 12, wherein the polyether alcohol used is a condensation product from an alkylphenol and ethylene oxide.

14. Process according to claim 1, wherein a further additive used is the polyhydroxy compound.

15. Process according to claim 1, wherein a further additive used is dextrin.

16. Process according to claim 1, wherein the inorganic acid of the salt is sulphuric acid, phosphoric acid, hydrochloric acid or carbonic acid.

17. Process according to claim 16, wherein the salt is sodium sulphate or sodium hydrogen sulphate.

18. Process according to claim 16, which process comprises preliminarily mixing, in a mixer, a spray dried cationic dye, sorbitol, a nonionic surface-active agent, dextrin and sulphamic acid, and stirring into this mixture the salt, which has been preheated to 70° to 90° C.

19. The composition produced by the process according to claim 1.

20. A process according to claim 18, wherein the inorganic salt is sodium sulfate.

21. A process for dyeing, printing or optically brightening a textile material, comprising the step of applying to the textile material the dye or optical brightener composition produced by the process of claim 1.

* * * * *